(12) United States Patent
Hansen (10) Patent No.: US 7,896,058 B2
(45) Date of Patent: Mar. 1, 2011

(54) SIDE WINDOW ROLLER BLIND WITH HINGED PULL ROD AND RECTANGULAR SUPPORT ROD

(75) Inventor: Melf Hansen, Gondelsheim (DE)

(73) Assignee: BOS GmbH & Co. KG, Ostfilder (DE)

( * ) Notice: Subject to any disclaimer, the term of this patent is extended or adjusted under 35 U.S.C. 154(b) by 0 days.

(21) Appl. No.: 12/052,178

(22) Filed: Mar. 20, 2008

(65) Prior Publication Data

US 2008/0230190 A1 Sep. 25, 2008

(30) Foreign Application Priority Data

Mar. 21, 2007 (DE) ............. 10 2007 014 099
Apr. 2, 2007 (DE) ............. 10 2007 016 154

(51) Int. Cl.
- *B60J 3/00* (2006.01)
- *A47H 5/00* (2006.01)
- *A47H 1/00* (2006.01)

(52) U.S. Cl. ............. 160/370.22; 160/310; 160/265

(58) Field of Classification Search ............. 160/370.22, 160/310, 311, 314, 265; 296/152, 97.7, 97.8, 296/97.4

See application file for complete search history.

(56) References Cited

U.S. PATENT DOCUMENTS

| | | | | |
|---|---|---|---|---|
| 810,278 | A * | 1/1906 | Hopkins | 160/277 |
| 1,012,239 | A * | 12/1911 | Bourne | 296/84.1 |
| 1,575,695 | A * | 3/1926 | La Rue | 185/45 |
| 1,944,454 | A * | 1/1934 | Park | 160/265 |
| 2,465,853 | A * | 3/1949 | Dalton, Jr. | 4/558 |
| 3,180,401 | A * | 4/1965 | Gambon et al. | 160/265 |
| 5,033,527 | A * | 7/1991 | Ouvrard et al. | 160/310 |
| 5,076,633 | A * | 12/1991 | Hsu et al. | 296/97.4 |
| 5,746,469 | A * | 5/1998 | Nonaka | 296/97.7 |
| 6,047,762 | A * | 4/2000 | Anderson | 160/370.22 |
| 6,276,430 | B1 * | 8/2001 | Wu et al. | 160/265 |
| 6,347,825 | B2 * | 2/2002 | Seel et al. | 296/97.8 |
| 6,910,518 | B2 * | 6/2005 | Zimmermann et al. | 160/370.22 |
| 6,942,002 | B1 * | 9/2005 | Williams | 160/265 |
| 6,983,786 | B2 * | 1/2006 | Chen | 160/370.22 |
| 7,347,246 | B2 * | 3/2008 | Ayran | 160/370.22 |
| 7,364,215 | B2 * | 4/2008 | Kim | 296/97.4 |
| 2001/0022218 | A1 * | 9/2001 | Schlecht et al. | 160/370.22 |
| 2001/0038224 | A1 * | 11/2001 | Seel et al. | 296/97.8 |
| 2002/0060470 | A1 * | 5/2002 | Schlecht et al. | 296/97.4 |
| 2003/0094249 | A1 * | 5/2003 | Zimmermann et al. | 160/370.22 |
| 2005/0061454 | A1 * | 3/2005 | Chen | 160/370.22 |
| 2005/0257903 | A1 * | 11/2005 | Schimko et al. | 160/370.22 |
| 2006/0000566 | A1 * | 1/2006 | Ganser et al. | 160/370.22 |
| 2006/0065375 | A1 * | 3/2006 | Chen | 160/370.22 |

(Continued)

FOREIGN PATENT DOCUMENTS

DE 19806736 A1 8/1999

(Continued)

*Primary Examiner*—Katherine Mitchell
*Assistant Examiner*—Jaime F Cardenas-Garcia
(74) *Attorney, Agent, or Firm*—Leydig, Voit & Mayer, Ltd.

(57) ABSTRACT

A window roller blind that has a shade, the free end of which is connected to a pull rod. In order to guide movement of the pull rod during extension and retraction of the roller blind, a support rod is connected to pull rod by means of articulated connection.

11 Claims, 5 Drawing Sheets

U.S. PATENT DOCUMENTS

| | | | |
|---|---|---|---|
| 2006/0260771 A1* | 11/2006 | Takeuchi et al. | 160/370.22 |
| 2007/0023152 A1* | 2/2007 | Starzmann et al. | 160/370.22 |
| 2007/0158970 A1* | 7/2007 | Kim | 296/97.4 |
| 2008/0017335 A1* | 1/2008 | Pohl et al. | 160/370.22 |
| 2008/0053630 A1* | 3/2008 | Lekar | 160/370.22 |
| 2008/0216972 A1* | 9/2008 | Starzmann et al. | 160/310 |

FOREIGN PATENT DOCUMENTS

| | | | |
|---|---|---|---|
| DE | 19826537 A1 | | 12/1999 |
| DE | 20112948 | * | 10/2001 |
| DE | 20112948 U1 | | 10/2001 |
| DE | 10204331 | * | 8/2003 |
| DE | 10204331 A1 | | 8/2003 |
| DE | 20309690 U1 | | 9/2003 |
| DE | 20200401652 U1 | | 3/2006 |
| DE | 202004014652 | * | 3/2006 |
| DE | 202006011248 U1 | | 9/2006 |
| EP | 601454 A1 | * | 6/1994 |
| EP | 1123824 A2 | | 8/2001 |

* cited by examiner

SIDE WINDOW ROLLER BLIND WITH HINGED PULL ROD AND RECTANGULAR SUPPORT ROD

FIELD OF THE INVENTION

The present invention relates generally to window roll-up shades, and more particularly, to roll-up shades for the side windows of motor vehicles.

BACKGROUND OF THE INVENTION

The current trend for side window roller blinds of motor vehicles is to conceal the guide mechanisms for guiding the roller blind as much as possible. Thus, the previously used guide rails running on the sides of the rectangular part of the window must be replaced by guide or support rods. When the roller blind is deployed, the support rods, as their name implies, support the pull rod that is arranged at the free end of the shade. It thus takes on two functions, namely, guiding the pull rod such that it remains against the window and generating the necessary thrust to unwind shade from the winding shaft and keep it under tension.

The pull rod that is mounted at the free upper end of the support rod is intended to distribute the force exerted by the pull rod uniformly onto the shade so that it is kept taut and free of folds in all areas. In particular, it is considered unattractive if any slanted folds appear in the shade. These can result if the angle of connection between support rod and pull rod is offset with respect to the angle that the shade tends to assume due to its shape during unwinding from the winding shaft.

Also problematic in the known roller blinds are conical winding shafts. Heretofore, it has only been possible to use such winding shafts in connection with manually operated window roller blinds.

OBJECTS AND SUMMARY OF THE INVENTION

It is an object of the present invention to provide a roller blind for a side window of a motor vehicle which can be advantageously used in conjunction with conical winding shafts without the danger of creating slanted folds in the shade when in an extended position.

The novel side window roller blind for motor vehicles has a winding shaft rotatably mounted underneath a lower edge of the window. A shade having a shape corresponding to a side window is fastened to the winding shaft at one edge. The pull rod is fastened to the other edge, which is remote from the winding shaft. At least one support rod that can be extended out of the door body past the lower edge of the window is movably seated inside the door body. The support rod is connected to the pull rod via an articulation such that the pull rod can situate itself with respect to the support rod corresponding to the tension conditions in the shade.

The support rod is guided at the predetermined angle, i.e., approximately vertically with respect to the lower edge of the window, with the aid of a guide mechanism arranged underneath the lower edge of the window. A drive unit serves to actuate the winding shaft in the direction for winding up the shade onto the winding shaft.

With the aid of the novel arrangement of the present invention, it is possible to use side window roller blinds with conical winding shafts. Conical winding shafts are primarily required if the upper edge of the window does not run parallel to the lower edge of the window, and the pull rod is nonetheless intended to run as parallel to the lower edge of the window as possible in the retracted state in order to be as inconspicuous as possible. With such side window roller blind configurations, the pull rod consequently undergoes a pivoting motion during the extension of the shade. By using articulations between the support rods and the pull rod, these pivoting motions can be absorbed without further effort and without creating significant tensions. When two support rods are used in such arrangement, they can have different effective lengths, depending on the requirements.

The guide mechanism inside the door body can extend over the entire extension length, or only over a part of it, i.e., the upper area. Extension of the guide mechanism over the entire range of movement has the advantage that any possibility of lateral bending inside the door under pressure stress is prevented. Furthermore, such a guide mechanism allows easier articulation of a tensioning or compressing means that is used to move the support rod, since a lateral force also naturally results from these tensioning or compressing means due to the asymmetrical force induction.

If only a single support rod is used, it is advantageous if the latter has a shape deviating from the circular shape, for instance, a rectangular cross-sectional shape. A support rod with such a shape is capable of introducing twisting torques into the guide mechanism, which conversely implies that the pull rod together with the support rod cannot rotate or swing with respect to the longitudinal axis of the latter.

A number of known arrangements can be used for driving the novel side window roller blind. In the simplest case, this includes manual actuation, in which case the force in the direction of winding up the shade is applied to the winding shaft by a spring motor. Electrical systems are likewise suitable, with either the winding shaft or the support rod or rods preferably being moved by the electric motor, while the respective other component is coupled to a spring motor, which ensures that the shade remains under tension in any operating position.

Other objects and advantages of the invention will become apparent upon reading the following detailed description and upon reference to the drawings, in which:

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DESCRIPTION OF THE PREFERRED EMBODIMENTS

Figure 1:
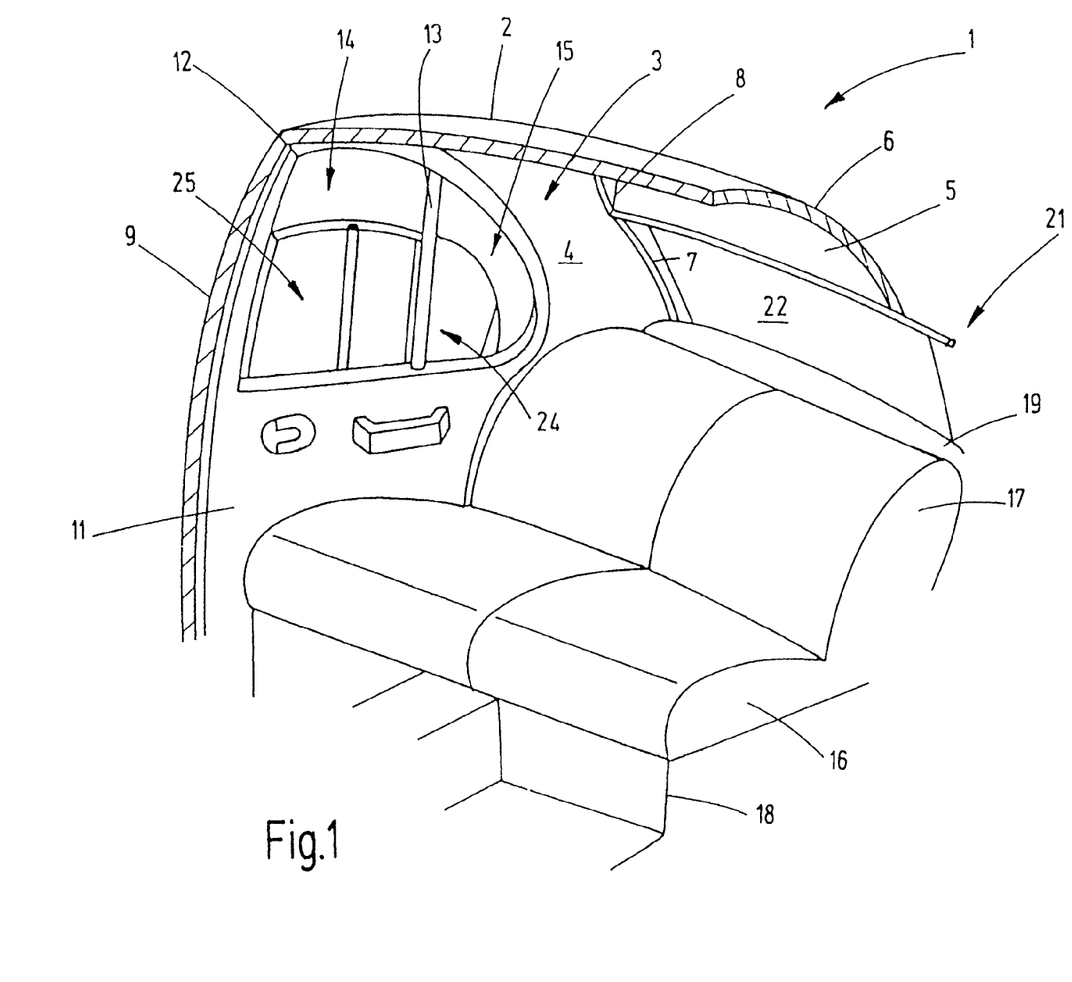
FIG. 1 is a cutaway perspective of the rear area of a passenger automobile having a side window roller blind in accordance with the invention.

Referring now more particularly to FIG. 1 of the drawings, there is shown the rear area of a passenger car having a side window roller blind in accordance with the invention. The figure illustrates a view onto the right interior side, which is a mirror image of the broken-away left interior side. Unless otherwise indicated, the explanations for the right body side apply accordingly to the left body side as well. The representation is simplified; for instance, structures inside the bodies such as reinforcements and fastening means are not shown, since a representation thereof is not required for understanding the invention.

The illustrated vehicle has a body section 1 that comprises a roof 2 from which a C-column 3 extends laterally downward to a bottom group, not shown. A corresponding C-column exists on the opposite broken away side of the vehicle. The C-column 3 is furnished on its inner side with an inside trim panel 4.

A roof 2 transitions at its rear edge into a rear window 5 that is delimited at its upper side by an upper window edge 6. At the lateral edges, which run mirror-symmetrically with respect to each other, only a section 7 that transitions at a corner area 8 into upper window edge 6 is shown.

The width of rear window 5 is larger at a mid or belt line of the body than in the area of upper window edge 6. At some distance in front of C-column 3 there is a B-column 9, onto which a right rear side door 11 is hinged in a known manner. Right rear side door 11 contains a window cutout 12, which is subdivided by a vertical strut 13 into a substantially rectangular section 14 and a roughly triangular section 15.

The interior additionally includes a rear seat bench with a seat surface 16 and a seat back 17. The seat back 17 is situated on a conventional bottom group 18. A window ledge 19 extends between the rear upper edge of the seat back 17 and the rear window 5.

The rear window 5 is furnished with a rear window roller blind 21 of which only a shade 22 can be seen in FIG. 1. Additional window roller blinds are situated at side window 12, in particular, a shade 25 in the rectangular window section 14 and a shade 24 in the triangular section 15.

Figure 2:
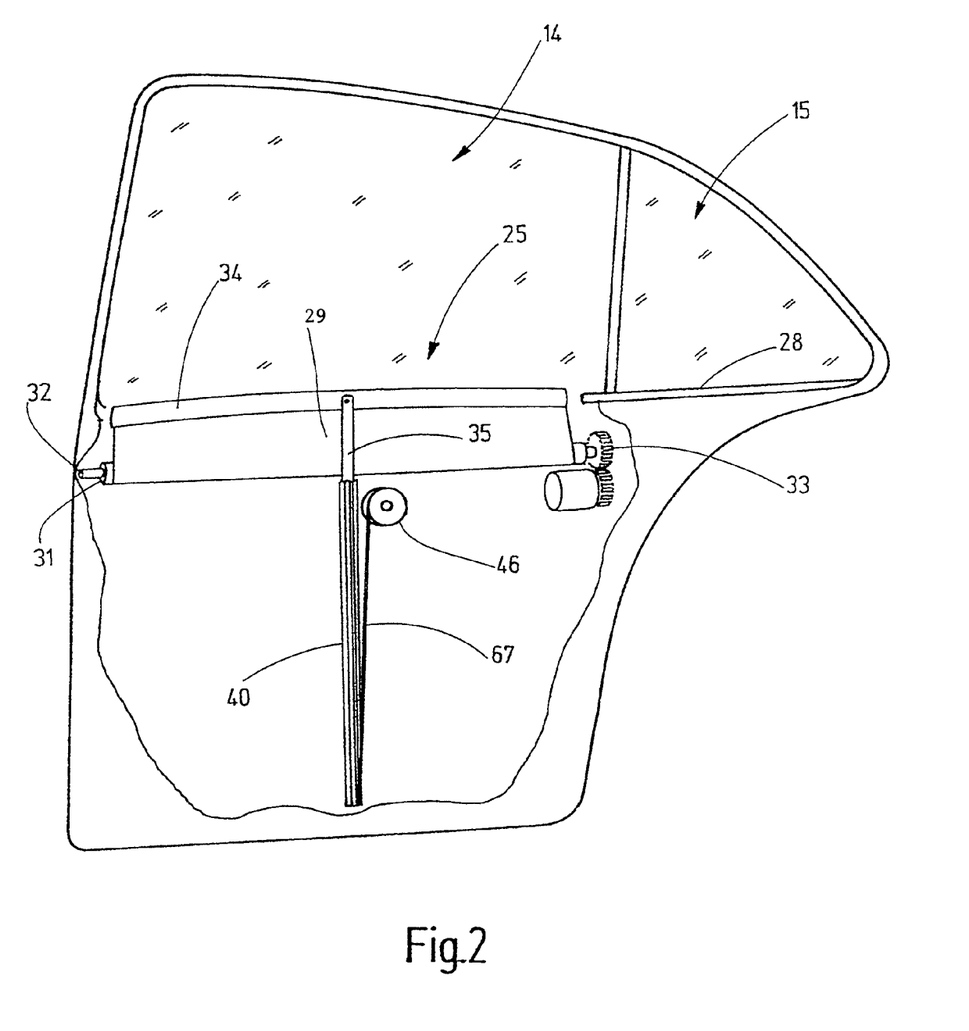
FIG. 2 is a schematic depiction of a rear right side door with the interior trim panel cutaway to reveal the side window roller blind.

The side door depicted in FIG. 1 is shown enlarged in FIG. 2. The inside trim is broken off in order to allow the structure of the side window roller blind 25 to be recognized. As is evident, the underside of the window cutout is delimited by a lower window edge 28 having an appropriate slot (not recognizable in the figure) through which the window roller blind 25 can be extended out of the body of the side door 11. The window roller blind 25 includes a shade 29 fastened at one edge to a winding shaft 31. The winding shaft 31 is rotatably seated beneath the lower window edge 28 in the body of the door with the aid of bearing journals 32 and 33. The bearing blocks for the bearings are not shown for reasons of clarity.

The shade 29 consists of an essentially unstretchable material that is suited to produce sufficient shading effect. The cut of the shade 29 corresponds roughly to the size of the window cutout 14. The shade 29 has a pull rod 34 at its free edge.

Figure 3:
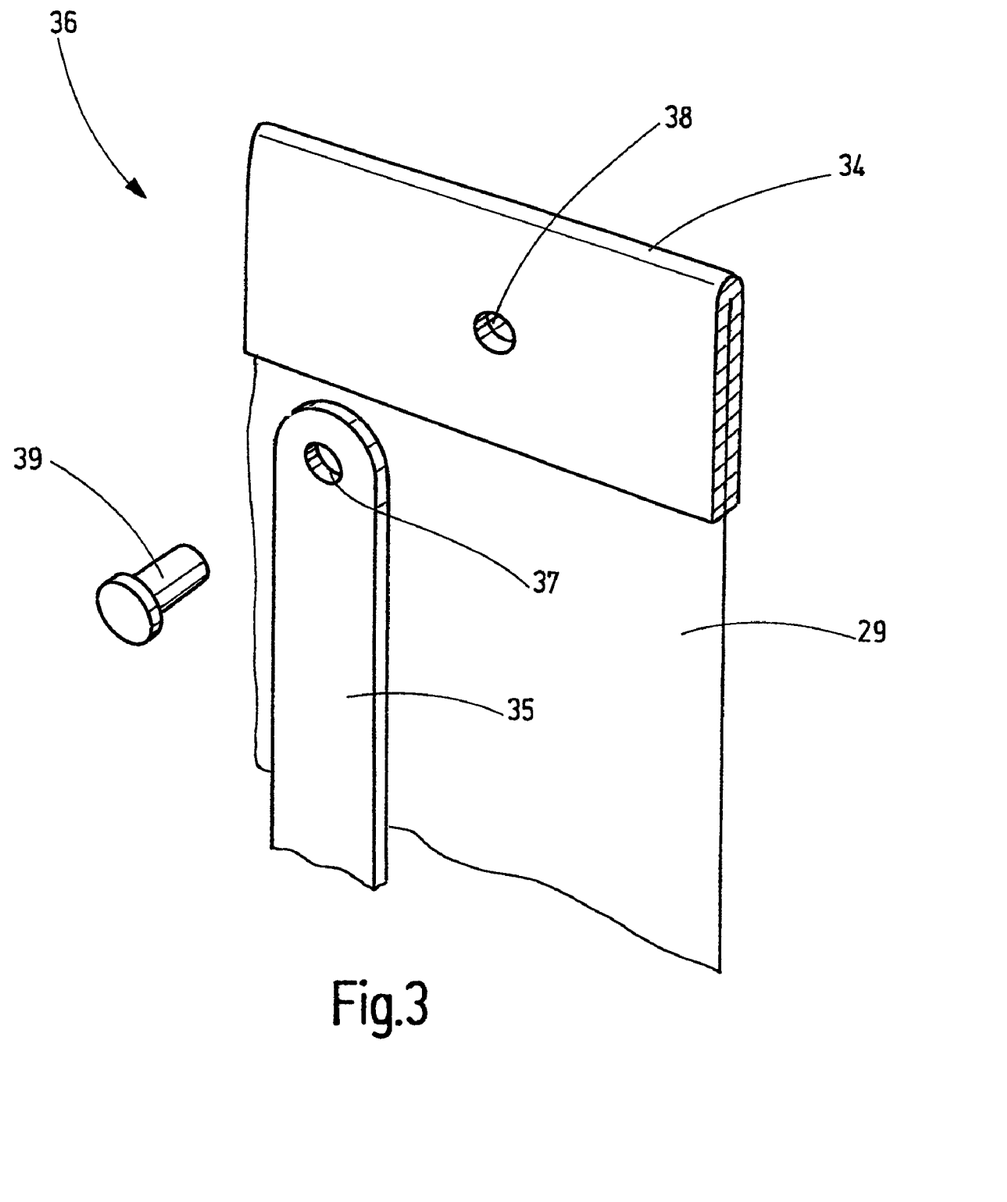
FIG. 3 is an exploded, fragmentary perspective of a connection between a support rod and pull rod of the roller blind shown in FIG. 2.

A support rod 35 is provided as a mechanism for guiding movement of the pull rod 34 between the retracted position as shown in FIG. 2 and an extended position. The support rod 35 in this case is a straight rod with a rectangular cross section that is capable of supporting and moving the pull rod 34 without bending. The large surface of the support rod 35 is oriented parallel to the surface of the window. The upper end of the support rod 35 is connected to the pull rod 24 with a hinge articulation 36, as depicted in FIG. 3. The hinge articulation 36 in this instance includes a hole 37 contained in the support rod 35, which is aligned with a hole 38 in the pull rod 34. A bolt 39 in the form, for instance, of a rivet that connects the two parts rotatably together through the two holes. This results in a hinge articulation, the hinge axis of which is perpendicular to the plane that is defined by the tensioned shade 29. The pull rod 34 can swing about the hinge axis and position itself freely such that the forces acting in the shade 29 to the left and the right of hinge 36 are equal, thereby avoiding one-sided tensioning in the shade 29 that can cause slanted folds in the shade 29.

The support rod 35 runs in a guide rail 40 that is mounted in the door body and does not project up past lower window edge 28. The support rod 35 is guided approximately perpendicular to lower window edge 28 with the aid of the guide rail 40. The guide rail 40 need not necessarily run straight inside the door body over its entire length; for instance, it can be curved about an axis parallel to the vehicle axis in order to follow the curve of the door.

Figure 4:
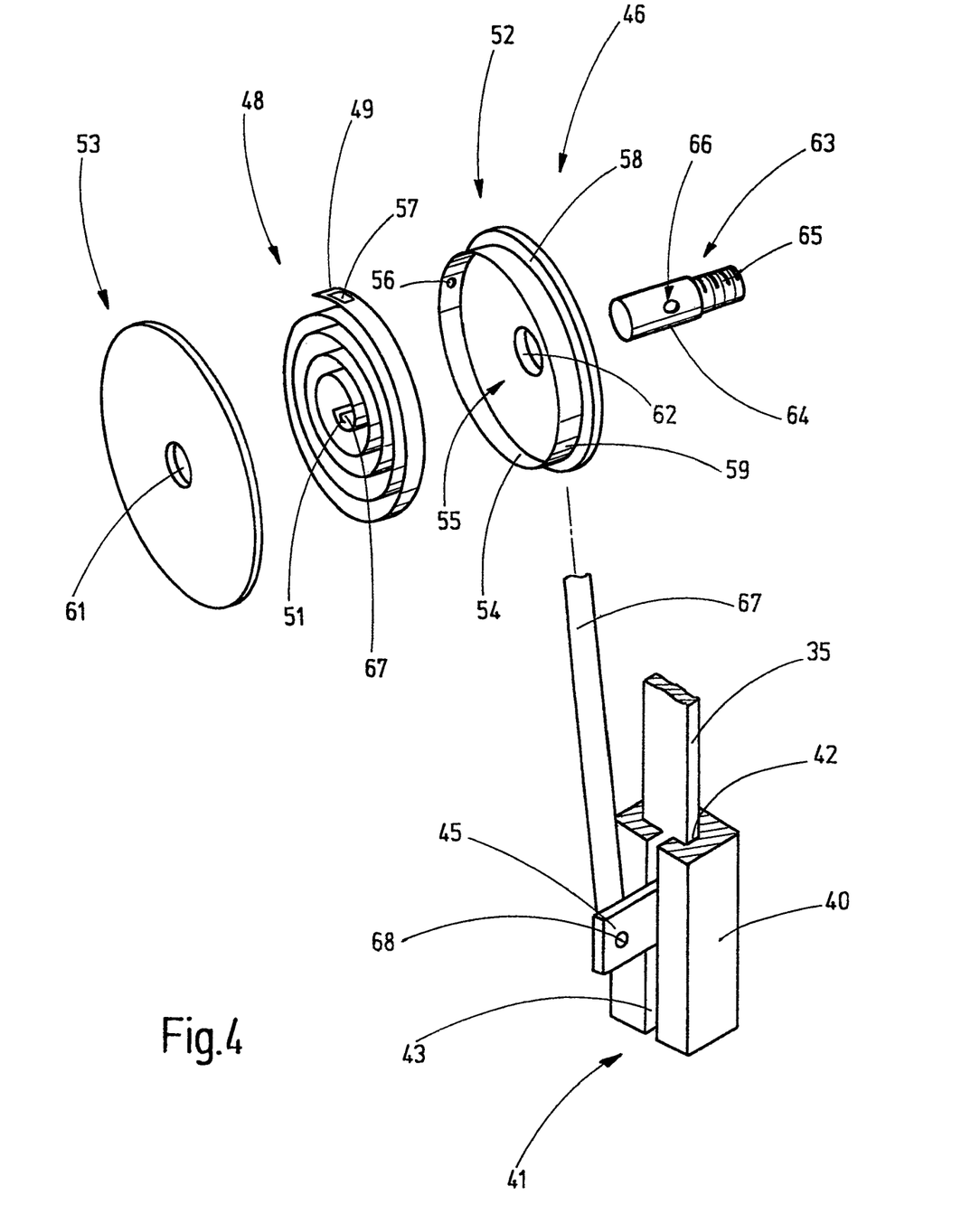
FIG. 4 is an exploded perspective of the spring motor of the side window roller blind shown in FIG. 2.

The guide rail 40 has a guide groove 41 that is constructed with an undercut, as depicted in FIG. 4. The groove profile is composed of a rectangular groove chamber 42 and a rectangular groove slot 43, the width of which is less than the length of the groove chamber 42, which results in an undercut structure. The diameter or width of the groove chamber 42 corresponds to the cross section of the support rod 35 guided therein.

A bracket 45 that projects outwardly through a slot 43 is connected to the lower end of the support rod 35, as also depicted in FIG. 4. The support rod 35 is biased by an associated spring motor 46 into the extended position. The spring motor 46 is seated just underneath the lower window edge 28 and the winding shaft 31, as depicted in FIG. 2.

The internal structure of the spring motors 46 is shown by the exploded representation in FIG. 4. The spring motor 46, for example, includes a spiral spring 48 constructed as a flat spring with an external end 49 and in internal end 51. The spring motor 46 additionally includes a spring motor housing 52 with an associated cover 53. The housing 52 is in the shape of a cup having a cylindrical housing wall 54 and a side wall 58 that encloses a cylindrical interior 55. The cylindrical housing wall 54 has an inwardly-projecting extension 56, onto which the outer spring end 49 is hooked in a form-fit manner by means of an opening 57 in the spring. The side wall 58 projects radially past an outer circumferential surface 59 of the wall 54, as further depicted in FIG. 4.

The cover 53 has the same diameter as the side wall 58 and can be snapped or locked together with the wall 54 by cylindrical anchoring means, not shown in detail. A bearing hole 61, 62 for a shaft 63 extends centrally through the walls 58, 53, respectively. The shaft 63 is composed of a cylindrical section 64 and a threaded section 65. The cylindrical section 64 has a radially protruding lug or tip 66, which can be hooked into an opening 57 on the inner spring end 51. Snap rings or retaining rings, not shown in detail, can be used to lock the housing 52 in the axial direction on the shaft section 64. The shaft 63 in turn can be bolted, in a manner, onto a bracket in the door body with the aid of threaded section 65.

As is easily recognized from the drawings, the housing 52 together with the disk 53 placed on it forms a flanged wheel with a cylindrical outer circumference formed by the outer circumferential surface 59 and flanges. A tension belt 67, which may be a textile belt, is fastened at one end to the circumferential surface 59, with the other end of the belt 67 being connected to the bracket 45 by a suitable rivet 68 or the like.

Finally, side window roller blind 25 includes a gear motor arrangement 70 that drives, via an output gear 71, a gear 72 that is fixed coaxially on winding shaft 31.

The mode of operation of side window roller blind 25 is as follows.

In the retracted state, the shade 29 is rolled up onto the winding shaft 31 to such an extent that the pull rod 34 is roughly flush at its upper side or upper edge with the lower window edge 28. In this position, the pull rod 35 has its maximum downward penetration depth, causing the tension belt 67 to be maximally unwound from the spring motor 46. The self-locking effect of gear motor 70 prevents the spring motor 46 from pulling the shade 29 from the winding shaft 31. As long as motor 70 is turned off, the side window roller blind 25 remains in the retracted position shown.

If the user wishes to deploy the side window roller blind 25, he sets gear motor 70 appropriately into motion; thereby causing the winding shaft 31 to rotate in the direction for unrolling the shade 29. As the shade 29 is released from the winding shaft 31, the spring motor 46 pushes the pull rod 34 upwardly via the support rod 35. This effect results because spring motor 46 tends, by means of the tension belt 67, to raise or displace the lower end of the support rod 35 in the direction towards the lower window edge 28.

When the shade 29 is completely deployed, i.e., the pull rod 34 has arrived at the upper edge of the window, the gear motor 70 is shut off by an appropriate controller, which is not the subject matter of the invention here. Thereby the spring motor 46 is prevented from pushing the pull rod 35 further out because the unstretchable shade 29 stops an additional shade movement 29 due to the braked winding shaft 31.

In the upper position, the tension belt 67 is maximally wound up onto the housing 52 of the spring motor 46. In order for the tension to be preserved in the tension belt 67, the lower end of the support rod 35 must stop an appropriate distance underneath the spring motor 46 in this uppermost position.

In order to retract the side window roller blind 25, the gear motor 70 is set in motion with the opposite direction of rotation. The winding shaft 31 is thus put in rotation in the direction for winding up the shade 29. Since the shade 29 is unstretchable, the corresponding forces are transferred to the pull rod 34 and from there the support rod 35, which is forced to penetrate correspondingly deeper into the guide rails 40. The tension belt 67 is correspondingly unwound in the downward motion from the spring motor 46, increasing the biasing force of the spring motor 46.

It will be appreciated that the use of the tension belt has the advantage that an orderly winding up of the layers one above the other takes place on the spring motor housing. Cables can also be used but cause the risk that the layers may not lie one above the other and damage themselves over time.

The straight-edge cross-sectional shape of the support rod 35, in conjunction with the guide rail 40, has the advantage of preventing twisting of the support rod about the longitudinal axis. Even in case of vibrations about the longitudinal axis, the pull rod 34 returns to the position that is specifically determined by the support rod 35.

Figure 5:
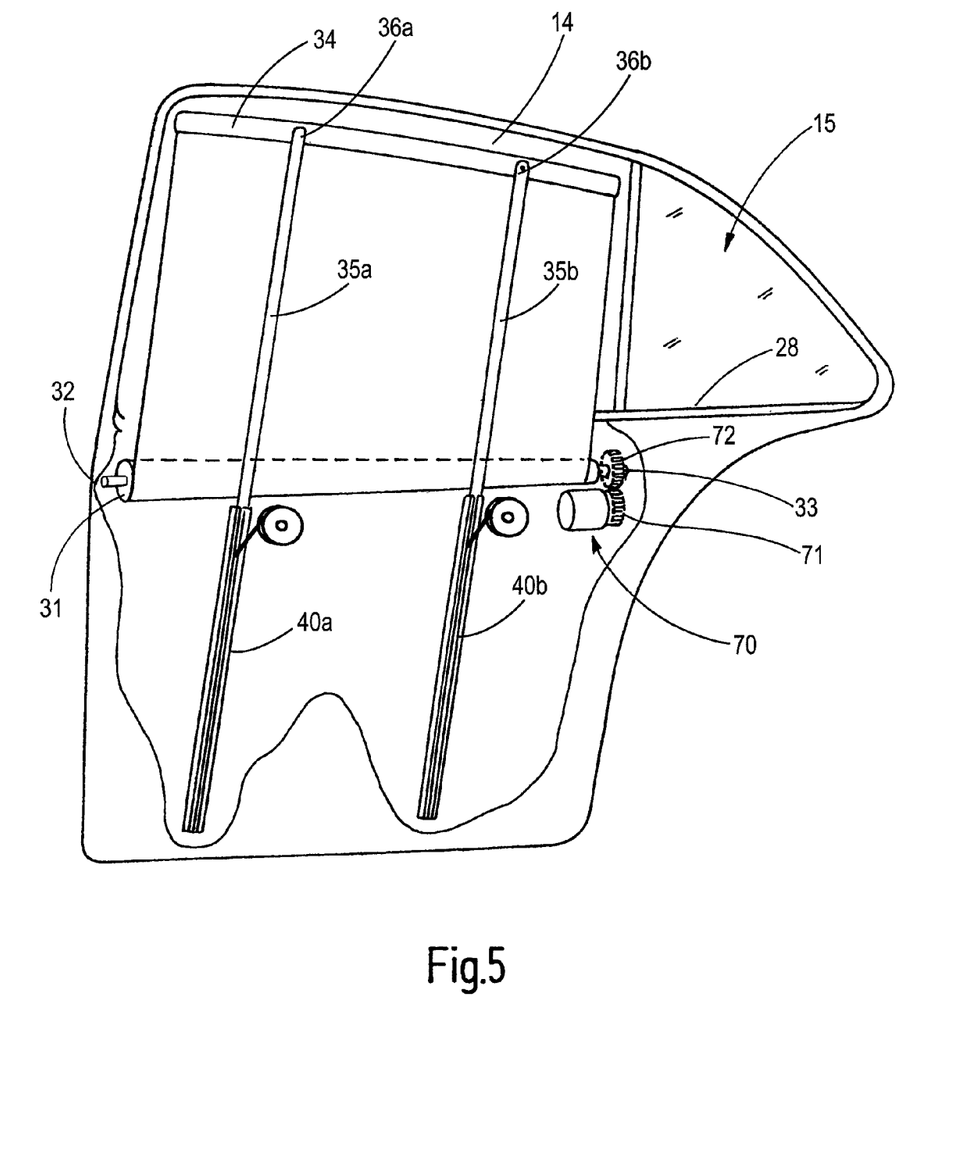
FIG. 5 is a schematic perspective of an alternative embodiment of the side window roller blind in accordance with the invention having a conical winding shaft and two support rods.

FIG. 5 shows another embodiment of a side window roller blind according to the invention in which similar parts have been given similar reference numerals with further explanation unnecessary. The essential difference from the FIG. 2 embodiment lies in the use of two support rods 35a,35b. Each support rod 35a,35b is connected via its own hinged articulation 36a,36b, respectively, to the pull rod 34. The articulations are constructed as described above and are spaced apart along pull rod 34.

The winding shaft 31 in this case is slightly conical, the thick end lying next to the front edge of the door, i.e., at the left as viewed in FIG. 5. The shade 29 has a corresponding shape. With this shape of the winding shaft 31, the pull rod 34 moves along a circular arc during the extension of the window roller blind. During its movement to the upper window edge, the pull rod 34, which initially lies parallel to the lower window edge 28, undergoes a pivoting motion about a point lying at the right of the figure. At the end of the extension movement, as can be understood from FIG. 5, the pull rod 34 lies parallel to the upper window edge, which runs at an angle to the lower window edge 28 in such a manner that the height of the window decreases towards the rear of the vehicle.

The pivoting movement of the pull rod 34 also results in a pivoting movement of the pull rod 34 with respect to the support rods 35a,35b. With the aid of articulations 36a,36b it is possible to control the pivoting motion, i.e., prevent strain forces between the support rods 35a,35b on the one hand and the pull rod 34 on the other, which could otherwise appear.

In order to allow winding and unwinding of the window shade in a manner that is flawless as possible, it is merely necessary to orient the guide rails 40a,40b at a slight angle. The longitudinal axes of the straight support rods 35a,35b are situated in such a manner that, with the roller blind extended, the longitudinal axis of the respective support rod 35a, 35b intersects the point at which the hinge axis of the respective hinged articulation 36a, 36b would lie with the roller blind completely retracted.

From the foregoing, a window roller blind is provided that has a shade with a free end connected to a pull rod. In order to guide movement of the pull rod during extension and retraction of the roller blind, a support rod is provided that is connected to the pull rod via a hinged articulation.

The invention claimed is:

1. A side window roller blind for automobiles (1) having a side window (14) with a lower window edge (28) and an upper window edge comprising:

a winding shaft (31) rotatably supported underneath the lower window edge (28), a shade (29) that has a shape corresponding to the shape of the side window (14), said shade being fastened at one edge to the winding shaft (31) and having a second edge remote from the winding shaft, an elongated pull rod (34) mounted on the second edge of the shade remote from the winding shaft (31) for movement with said shade (29) between shade retracted and extended positions, at least one elongated support rod (35) having an upper end and a lower end and being vertically moveable in its entirety with movement of the pull rod between said shade retracted and extended positions, said support rod having a non-circular cross section, a lifting device for raising the support rod, pull rod and shade to the extended position, said lifting device including a linear actuating member coupled to said support rod, and a spring motor operatively acting on said linear actuating member for moving said support rod in a direction for extending said shade from said winding shaft, a linear guide rail elongated in a direction parallel to the support rod and separate from the lifting device (40) disposed in depending relation to the winding shaft underneath the lower window edge (28), said guide rail having a guide groove with a non-circular cross section that conforms with the cross section of said support rod (35), for receiving a lower portion of the support rod (35), said guide rail extending a distance below the winding shaft corresponding to the length of a lower end of the support rod below said winding shaft when the window shade is in a retracted position for receiving and supporting the lower end of the support rod (35) along the entire length of said guide rail for guiding the support rod (35) for straight linear vertical movement transverse to the lower window edge (28) during movement of said pull rod (34) between said shade retracted and extended positions, a hinge connection (36) intermediate opposed ends of said elongated pull rod (34) connecting the upper end of said support rod (35) to said pull rod (34) for relative pivotal movement of said pull rod (34) with respect to said support rod (35) as an incident to vertical movement of said pull rod (34) and support rod (35), and a drive mechanism (46) for rotating the winding shaft (31).

2. The side window roller blind of claim 1 in which said hinge connection has a hinge axis oriented perpendicular to the plane of window (14).

3. The side window roller blind of claim 1 including two identical support rods (35) extending in parallel relation to each other, with each support rod being joined by a respective articulation (36) to said pull rod (34) at locations intermediate opposed ends of said pull rod.

4. The side window roller blind of claim 1 including two said support rods, with said support rods (35) having different lengths.

5. The side window roller blind of claim 1 in which said winding shaft (31) is conical in shape.

6. The side window roller blind of claim 1 in which said guide groove (41) extends with a constant cross section along said guide rail (40).

7. The side window roller blind of claim 6 including a bracket (45) that projects outwardly through said guide groove (41).

8. The side window roller blind of claim 1 in which said spring motor (46) is a rotatively acting spring motor.

9. The side window roller blind of claim 1 in which said spring motor (46) has a helical spring (48) in the form of a flat spring.

10. The side window roller blind of claim 1 in which said support rod is vertically movable in a substantially straight line of movement.

11. The side window roller blind of claim 1 in which said drive mechanism is an electric motor.

\* \* \* \* \*